United States Patent

[15] 3,643,126

Hay

[45] Feb. 15, 1972

[54] FREQUENCY-MEASURING SYSTEM UTILIZING MEANS FOR MOMENTARILY STOPPING THE VARIABLE FREQUENCY GENERATOR

[72] Inventor: Robert R. Hay, Santa Clara, Calif.

[73] Assignee: Hewlett Packard Company, Palo Alto, Calif.

[22] Filed: Mar. 4, 1970

[21] Appl. No.: 16,315

[52] U.S. Cl. ............................................. 315/26, 324/77 C
[51] Int. Cl. ........................................................ H01j 29/70
[58] Field of Search ................... 340/329 G, 324 A; 315/255, 315/25, 26; 307/233; 324/78, 81, 77 C

[56] References Cited

UNITED STATES PATENTS 3,441,850    4/1969    Frazier et al. ......................... 324/77 C

OTHER PUBLICATIONS

Bump et al., Three and One-Half Decades in One Clean Sweep, January 1968, pp 1–6

Whatley, Rapid Analysis at Low Frequency Spectra, December 1968, pp. 1–7

Primary Examiner—Carl D. Quarforth
Assistant Examiner—J. M. Potenza
Attorney—Stephen P. Fox

[57] ABSTRACT

A variable frequency receiver scans a spectrum of frequencies from a signal source, and a cathode-ray tube (CRT) system detects and displays the amplitude of the signal source as a function of the frequencies scanned. At any selected point of the amplitude response curve, the frequency scanning is momentarily stopped to produce a marker spot on the CRT screen. During the stop time, a digital counter counts the frequency of the variable frequency generator. Timing and logic circuitry controls the intensity of the marker spot and the length of the stop time in response to the counting time and the frequency scanning rate.

9 Claims, 4 Drawing Figures

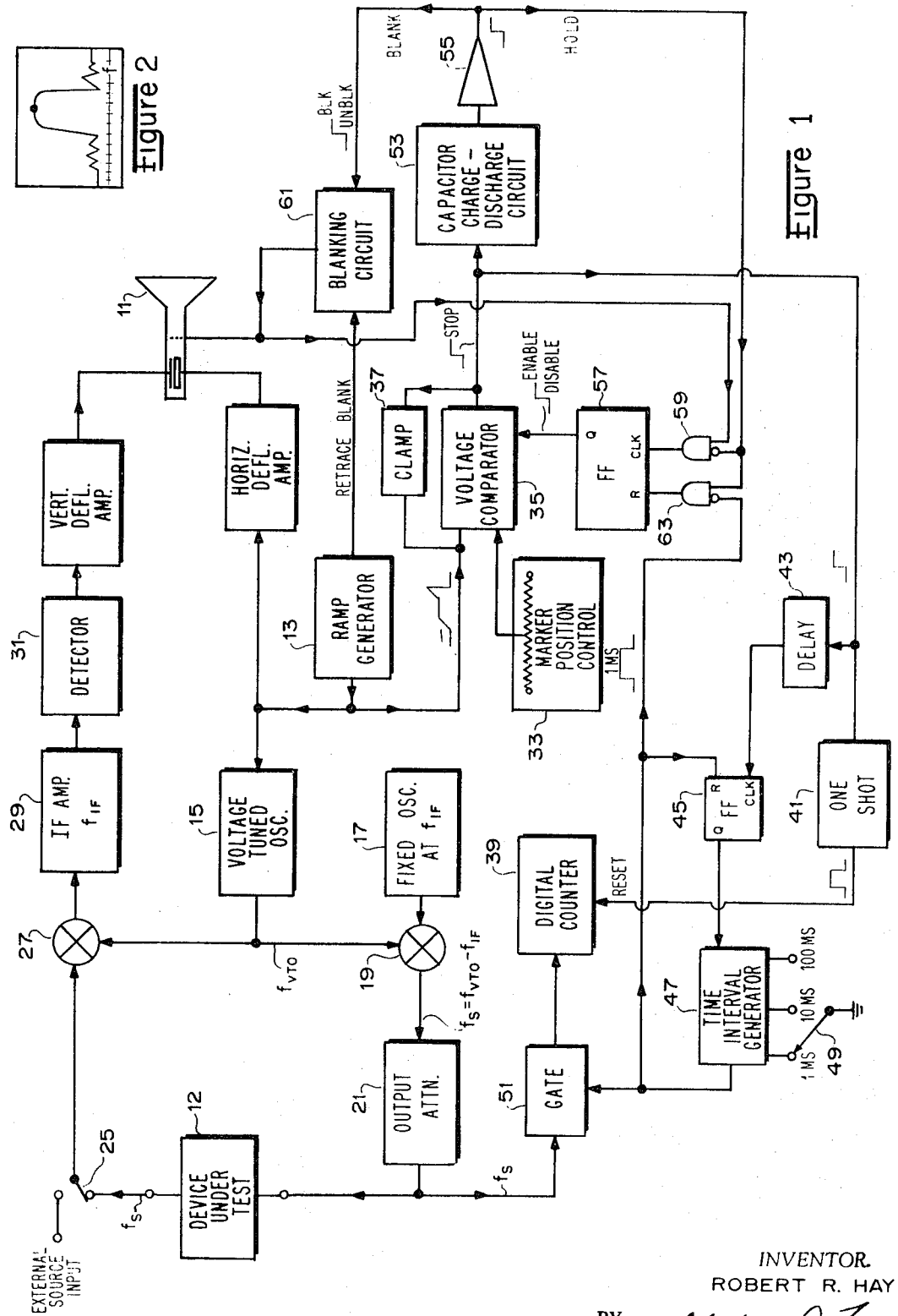

FREQUENCY-MEASURING SYSTEM UTILIZING MEANS FOR MOMENTARILY STOPPING THE VARIABLE FREQUENCY GENERATOR

BACKGROUND OF THE INVENTION

This invention relates generally to frequency spectrum analysis of an unknown signal source, and more particularly to the measurement of frequency at a selected point in the spectrum of a signal source, or in the frequency response curve of a device under test.

In one application of a frequency spectrum analysis instrument, a signal source is scanned through a range of frequencies and the amplitude output of a device under test is detected and displayed on a cathode-ray tube (CRT) screen as a function of the frequencies scanned. Often it is required to determine the frequency at a particular point of the response curve displayed on the screen. Heretofore this has been achieved in several ways.

According to one method, a frequency comb generator is used to produce a plurality of marker lines on the CRT screen at spaced frequency intervals, to thereby calibrate the horizontal axis of the screen in units of frequency. The response curve of the unknown signal source is simultaneously displayed on the screen in superimposed form. An operator may then determine the frequency at a selected point on the response curve by viewing the position of the point relative to the nearest marker line. With this method, accuracy is limited by the accuracy of the comb generator. Also, it is difficult to accurately measure the frequency of a point which is between two marker lines. Accuracy can be improved in this case by successively narrowing the full scale frequency range displayed on the screen and producing marker lines spaced at smaller frequency intervals, until the desired resolution is reached. However, the method is time consuming and impractical.

Another method of determining the frequency at a selected point on the response curve is to generate a marker line which is horizontally positionable on the CRT screen by adjusting a voltage level control knob. A dial is provided to calibrate the voltage level in terms of frequency. The marker is positioned to coincide with a selected point on the response curve and the frequency at this point is read from the dial. This method can be used to determine the frequency at any point on the display; however, it is limited in accuracy by errors in the CRT horizontal deflection circuitry and by errors in the marker position reference voltage. Typically the accuracy of such a marker is on the order of 1 percent.

SUMMARY OF THE INVENTION

It is an object of the present invention to provide a system capable of accurately and quickly measuring the frequency at any particular point on the frequency response curve or spectrum displayed.

In one embodiment of the invention, a signal source is repeatedly scanned through a frequency range, and the response of the device under test is displayed on a CRT screen as a function of the frequencies scanned. The exact frequency at any selected point on the amplitude response curve is determined by momentarily stopping the frequency scanning and measuring the signal source frequency with a digital counter.

A feature of the invention is that while the frequency scanning is momentarily stopped, a marker spot is produced on the CRT screen. The point at which the frequency of the signal source is counted and at which the marker spot is produced is set by a manually operable marker position control. The intensity of the marker spot is maintained at a predetermined brightness by a circuit which either holds the CRT beam on at the selected point of the display or blanks the beam after a predetermined time. The holding and blanking circuit responds to the digital counting time and the frequency scanning rate, both of which are variable. In overall operation of the invention, each time the frequency spectrum is scanned the frequency at the selected point of the response curve is counted, and the count of the digital counter is continually updated.

BRIEF DESCRIPTION OF THE DRAWINGS

FIG. 1 is a block diagram of a frequency spectrum analysis and measuring system incorporating the preferred embodiment of the present invention.

FIG. 2 is a front view of a CRT screen illustrating a frequency response curve and the marker spot produced by the invention.

DESCRIPTION OF THE PREFERRED EMBODIMENT

Figure 3:
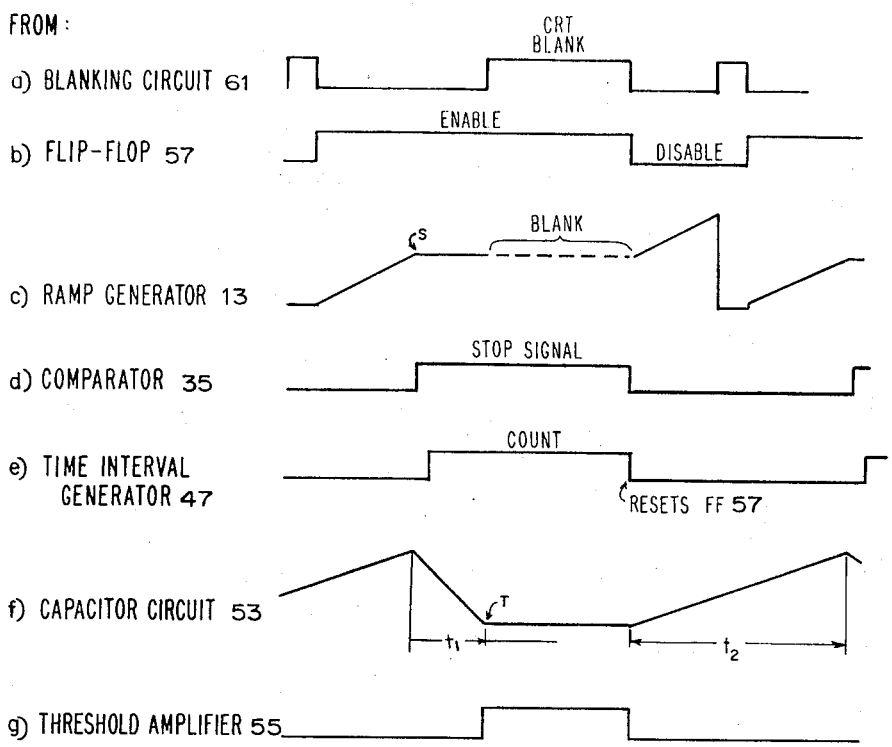
FIGS. 3 and 4 are waveform diagrams of the signals produced during operation of the system shown in FIG. 1.

Referring now to FIG. 1, there is shown a system including a swept frequency receiver wherein a cathode-ray tube 11 displays the response of a device under test 12 as a function of the frequencies scanned within a predetermined frequency spectrum. A ramp generator 13 produces a repetitive increasing voltage ramp which controls the horizontal deflection of the beam of the CRT 11. The ramp generator 13 also controls a voltage tuned oscillator 15 to provide a variable frequency generator having an output frequency which varies in response to the voltage level of the ramp signal. Thus, the output signal from the voltage tuned oscillator 15 repeatedly scans a predetermined frequency range. A fixed frequency oscillator 17 produces an intermediate frequency $f_{IF}$ which is less than or equal to the lowest frequency attainable by the oscillator 15. The frequencies $f_{VTO}$ and $f_{IF}$ are combined in a mixer indicated at 19 and the output thereof is a signal having a frequency $f_S$, where $f_S = f_{VTO} - f_{IF}$. Typically the range of $f_{VTO}$ is 200–300 megahertz and the frequency $f_{IF}$ is 200 megahertz. In this case, the range of the output signal $f_S$ is 0–100 megahertz.

The output signal from mixer 19 is applied through an output attenuator 21 to the device 12 to be tested. The device 12 may be a band-pass filter or amplifier, for example. The output from the device under test 12 is a signal source at frequency $f_S$ which is applied through a switch 25 to a mixer 27 where it is subtracted from the signal $f_{VTO}$ to produce a signal at the constant frequency $f_{IF}$. This output is amplified by an IF amplifier 29, then amplitude detected by a detector 31 and used to drive the vertical deflection plates of the CRT 11.

It can be seen that the voltage ramp from the ramp generator 13 determines the horizontal position of the CRT beam and tunes the oscillator 15, which in turn selects the frequency received from the device under test. The input signal $f_S$ to the device under test exactly tracks the input frequencies scanned by the receiver. The CRT beam is deflected vertically in accordance with the amplitude of the signal from the device 12 at the frequencies scanned. As a result, the CRT 11 displays the response curve of the device under test as a function of the frequencies scanned within a predetermined range.

In this case where the device 12 is a band-pass filter, a typical response curve which may be displayed on the screen of the CRT 11 is illustrated in FIG. 2. The frequency swept receiver may also be used to display the frequency spectrum of an external signal source. In this case, the contact arm of switch 25 would be moved to its upper position (as shown in the drawing).

The system of FIG. 1 also includes means for momentarily stopping the frequency scanning by the voltage tuned oscillator 15, thereby to maintain the frequency $f_{VTO}$ constant and to hold the CRT beam at one point on the screen. As a result, an intensified marker spot is produced on the screen at the point where the frequency scanning is momentarily stopped.

The position of the intensified marker spot is controlled by a marker position control circuit 33. This circuit includes a potentiometer which provides a variable voltage level corresponding to the horizontal position of the intensified marker spot on the CRT screen. This voltage level is applied to one input of a voltage comparator 35. The other input to the voltage comparator is the repetitive ramp voltage signal from the ramp generator 13. When the increasing voltage level of the ramp voltage signal reaches a predetermined relationship with the marker position control voltage level, for example, when these two voltage levels are equal, the output of voltage comparator 35 produces a "stop" signal to activate a voltage clamp 37 which holds the output of the ramp generator 13 constant at the level it had attained when the clamp was activated. During the time that the ramp generator output is held constant, the output frequency of the voltage tuned oscillator 15 is also held constant, and the CRT beam is stopped at a point on the screen determined by the marker position control 33. The length of time the beam is stopped is controlled by timing and logic circuitry, hereinafter described.

The stop signal from the voltage comparator 35 also enables a counting circuit including a digital counter 39. The stop signal is a logic signal and the onset thereof is indicated by a change in voltage levels. The leading edge of the stop signal triggers a one-shot multivibrator 41 to produce a short output pulse, which resets the digital counter 39 to zero. The leading edge of the stop signal is also delayed a short time by a delay circuit 43, which in turn clocks a flip-flop 45 a short time after the digital counter 39 is reset. When the flip-flop 45 is clocked, the Q-output thereof triggers a time interval generator 47. The time interval generator 47 then produces an output pulse having a time duration which is preset by a switch 49. As shown, the switch 49 may be positioned to provide an output pulse having a time duration of 1, 10, or 100 milliseconds. This output pulse enables a gate 51 which transmits the signal $f_S$ to the digital counter 39. At the end of the pulse from the time interval generator 47, the gate 51 is disabled to thereby stop the digital counter 39 from counting the frequency of the signal $f_S$. The trailing edge of the output pulse from the time interval generator 47 resets the flip-flop 45 and also signals a logic circuit which disables the voltage comparator, for purposes hereinafter described. The digital counter 39 includes suitable means for holding and displaying the digital count obtained at the completion of the counting interval.

It will be recalled from the above description that the signal from mixer 19 exactly tracks the frequencies scanned by the receiver, and that the signal $f_S$ is maintained constant during the time that the digital counter is operated because the voltage from the ramp generator 13 is clamped constant. Since the counter 39 measures the tracking signal and not the signal input to the receiver, the measurement is independent of characteristics of the input signal.

The stop signal from the voltage comparator 35 also enables a timing circuit including a capacitor charging and discharging circuit 53. As described hereinafter, when the output of the voltage comparator 35 is low, i.e., in the absence of a stop signal, the output of the capacitor circuit 53 is a signal which gradually increases with time. When the output of the voltage comparator 35 goes high, i.e., when a stop signal occurs, the output of the capacitor circuit 53 begins decreasing with time. A threshold amplifier 55 provides a logic output which is low when the voltage output of circuit 53 is above a predetermined level, and high when the voltage output from circuit 53 decreases below the predetermined level. Thus, the output of threshold amplifier 55 is normally low, but goes high a predetermined time interval after a stop signal is produced by voltage comparator 35. The logic signal output from amplifier 55 controls additional circuitry to either hold the CRT beam on the screen or blank the beam, to thereby maintain the marker spot at a predetermined brightness, as hereinafter described.

A logic circuit including a flip-flop 57 is provided to enable the voltage comparator 35 at the beginning of each voltage ramp from the ramp generator 13 and to disable the voltage comparator a predetermined time after it produces a stop signal. The enable–disable control input to the voltage comparator is provided by the Q-output of flip-flop 57. This flip-flop is clocked to enable the voltage comparator at the beginning of each voltage ramp by a pulse applied to one input of a logic gate 59 from a blanking circuit 61. The blanking circuit produces a pulse in coincidence with a pulse which blanks the CRT beam during the retrace time which occurs at the end of the voltage ramp from ramp generator 13. The other input to gate 59 insures that flip-flop 57 will not be clocked by a blanking pulse which occurs intermediate the retrace times when the output of threshold amplifier 55 is high. As described in more detail below, flip-flop 57 is reset in a first mode of operation when the output from the counting time interval generator 47 goes low and in a second mode of operation when the output signal from threshold amplifier 55 goes high. These two output signals are applied respectively to the two inputs of a logic gate 63, and flip-flop 57 is reset in response to whichever one of the two signals occurs last. When flip-flop 57 is reset, the voltage comparator 35 is disabled so that the output thereof goes low, thereby ending the stop signal.

In the event that the output of amplifier 55 goes high before the trailing edge of the pulse from the time interval generator 47 occurs, the output of amplifier 55 operates the blanking circuit 61 to blank the CRT beam until the counting interval is completed, and voltage comparator 35 is disabled after which the frequency scanning is resumed.

The system of FIG. 1 may operate in two different modes. The waveforms which occur in one of these two modes of operation are illustrated in FIG. 3. Immediately before a frequency-scanning cycle begins, the CRT beam retraces and is blanked by a pulse from the blanking circuit 61. This pulse is shown at the beginning of the waveform in FIG. 3a. The same retrace blanking pulse is applied to gate 59 to clock flip-flop 57 so that the Q-output thereof goes high to hereby enable the voltage comparator 35. The Q-output of flip-flop 57 is shown in FIG. 3b. FIG. 3c shows the increasing ramp voltage signal from the ramp generator 31. When the ramp voltage reaches a predetermined level S, as determined by the marker position control 33, the output of comparator 35 goes high, corresponding to the beginning of the stop signal, as shown in FIG. 3d. After a short delay provided by delay circuit 43, flip-flop 45 is clocked. As a result, the time interval generator 47 is triggered and the counting time interval is started, as shown in FIG. 3e.

At the onset of the stop signal, the previously increasing voltage output from capacitor charge-discharge circuit 53 begins decreasing, as shown in FIG. 3f. When this voltage decreases to a threshold point T, the output of threshold amplifier 55 goes high, as shown in FIG. 3g. By comparing FIGS. 3e and 3g, it can be seen that the output of threshold amplifier 55 goes high while the digital counter 39 is still counting the frequency of the signal source transmitted through gate 51. The signal conditions at the input to logic gate 63 prevent flip-flop 57 from being reset and thereby maintain voltage comparator 35 in an enabled condition, so that clamp 37 is maintained active and the beam of the CRT is held stationary at the selected point on the screen. At this time, the high level output from threshold amplifier 55 controls blanking circuit 61 so that the beam is blanked (compare FIGS. 3a and g). Thus, the brightness of the marker spot on the CRT screen is limited because the beam is maintained on only during the time interval $t_t$ (FIG. 3f) between the onset of the stop signal and the time at which the output of amplifier 55 goes high.

When the output pulse from time interval generator 47 (FIG. 3e) goes low, flip-flop 57 is reset, comparator 35 is disabled, and the clamp 37 releases the output of ramp generator 31, to thereby continue the ramp signal. As a result, the frequency scanning of the receiver is resumed, and the CRT beam is deflected horizontally in coincidence therewith.

Figure 4:
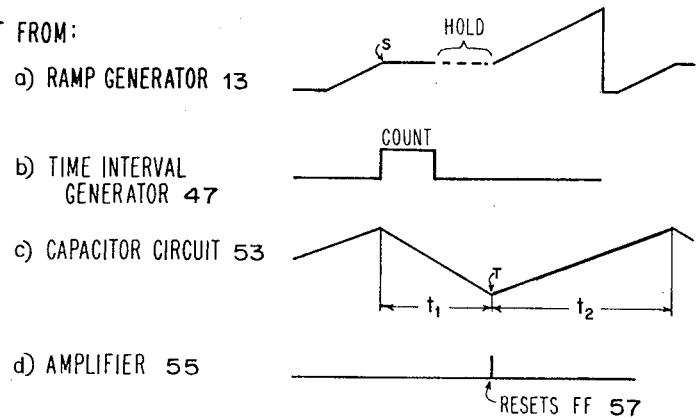

A second mode of operation of the system is illustrated by the waveforms in FIG. 4. As shown in FIG. 4a, the output from the ramp generator 13 is clamped constant when it reaches a predetermined threshold level S. The voltage comparator 35 is enabled and a stop signal is produced in the same manner as described above. The stop signal causes the time interval generator 47 to be triggered to start a counting time interval as shown in FIG. 4b. Simultaneously, the voltage output from the capacitor circuit 53 begins decreasing, as shown in FIG. 4c. In this case, the counting interval is shorter than the one in the first mode of operation (FIG. 3e), so that it ends before, rather than after, the output voltage from circuit 53 decreases to the threshold level T (compare FIGS. 4b and c). Therefore, the end of the count interval does not reset flip-flop 57. Instead, the voltage comparator 35 remains enabled and clamp 37 holds the output of ramp generator 13 constant, to thereby hold the CRT beam on at the selected point of this screen. There is no blanking of the beam at this time because the output of threshold amplifier 55 is low. After the time interval $t_1$, when the output of circuit 53 decreases to the threshold level T, the output of amplifier 55 goes high and resets flip-flop 57, which in turn disables comparator 35. As a result, the stop signal immediately ceases, the output of capacitor circuit 53 begins rising above the threshold level T, and the output of amplifier 55 goes low. As shown in FIG. 4d, the output of threshold amplifier 55 which resets flip-flop 57 is only a short voltage pulse. Blanking circuit 61 includes suitable timing circuitry to prevent this short voltage pulse from momentarily blanking the beam.

From the foregoing, it can be seen that the intensity of the marker spot is controlled by blanking the CRT beam for the time when the counting time interval exceeds the time interval $t_1$, and by holding the CRT beam on the screen when the counting time interval is less than the time interval $t_1$. As described above, the length of the counting time interval is variable by changing the position of the switch 49. In effect, comparator 35 is disabled and voltage clamp 37 is released in response to the end of the longer of the counting interval produced by the time interval generator 47 and the time interval $t_1$.

In overall operation of the system, the ramp generator 13 repeatedly produces voltage ramp signals, and the horizontal movement of the CRT beam is momentarily halted when the voltage ramp reaches a predetermined threshold level. During the time when the voltage ramp signal is not clamped, the capacitor charge-discharge circuit 53 charges to produce an increasing output voltage level. As shown in FIGS. 3f and 4c, this increasing output voltage occurs during the time $t_2$. The actual durations of the time intervals $t_1$ and $t_2$ are dependent upon the frequency scanning rate, i.e., the rate at which the output of the ramp generator 13 deflects the CRT beam horizontally across the screen. However, the charge and discharge rates of the capacitor charge-discharge circuit 53 are controlled so that the ratio to the charge time $t_2$ to the discharge time $t_1$ is always maintained constant. This may be achieved by selectively coupling suitable current sources and sinks to a capacitor of circuit 53, for example.

In summary, each time the frequency spectrum is scanned, the CRT beam is stopped at the point selected by the marker position control 33. While the beam is stopped, it produces an intensified marker spot on the screen, and the frequency of the signal source at this point in the spectrum is counted by the digital counter 39. The digital counter is continuously updated because a new count is obtained each time the frequency spectrum is scanned.

I claim:

1. In a system for controlling the beam of a cathode-ray tube having a display screen, an improvement for determining the frequency at a selected point on a swept frequency display on said screen comprising:
   variable frequency generator means for scanning a predetermined frequency range;
   means for receiving a signal to be displayed on the screen of said cathode-ray tube;
   means for controlling the beam of said cathode-ray tube to trace the magnitude of said received signal as a function of the frequencies scanned by said variable frequency generator means;
   means for stopping momentarily the scanning of said variable frequency generator means at a preselected position on the display traced by said cathode-ray tube beam, thereby to produce an intensified marker spot on said display screen at said preselected position; and
   means for counting the frequency of said variable frequency generator means when the scanning of said frequency range is momentarily stopped by said stopping means.

2. The system of claim 1,
   said variable frequency generator means having an output connectable to an input of a device under test;
   said receiving means having an input connectable to an output of said device under test; and
   said beam controlling means being operable to trace a selected output characteristic of said device under test as a function of the frequencies scanned by said variable frequency generator means.

3. The system of claim 1, said variable frequency generating means including:
   ramp generator means for producing a voltage ramp output signal; and oscillator means for producing a frequency which varies in response to the voltage level of said voltage ramp signal;
   said stopping means including:
   said circuit means for producing a stop signal in response to said output voltage attaining a level corresponding to the preselected position of said intensified marker spot on the display traced by said cathode-ray tube receiver means; and
   means for holding the output voltage of said ramp generator constant in response to said stop signal; and
   said counting means being operative to count for a predetermined time interval in response to said stop signal.

4. The system of claim 3, said circuit means including:
   means providing an adjustable voltage level corresponding to the position of said intensified marker spot; and
   comparing means for producing said stop signal in response to the output voltage from said ramp generator attaining a predetermined relation to said adjustable voltage level; and
   said holding means including a voltage clamp.

5. The system of claim 3, further including
   timing means responsive to said stop signal from said circuit means for producing a timing signal having a predetermined time interval; and
   logic means for disabling said circuit means to cause said circuit means to resume scanning of said frequency spectrum by said variable frequency generator means, said logic means being operative in response to the end of the longer one of the time intervals produced by said counting means and said timing means.

6. The system of claim 5, further including means for blanking the beam of said cathode-ray tube means when the time interval of said counting means exceeds that of said timing means.

7. The system of claim 5, wherein said timing means includes a capacitor circuit having a discharge time responsive to the duration of said voltage ramp output signal to produce a time interval having a predetermined relationship to the scanning speed of said voltage ramp output signal.

8. The system of claim 5, further including means for enabling said circuit means in response to the beginning of each output voltage ramp signal from said ramp generator means.

9. The system of claim 1, wherein said counting means includes:
   a digital counter; and
   means for gating the frequency from said source to said digital counter for a preselected time interval.

* * * * *